(12) United States Patent
Miyamoto et al.

(10) Patent No.: US 9,433,064 B2
(45) Date of Patent: Aug. 30, 2016

(54) LIGHT SOURCE APPARATUS, IMAGE DISPLAY APPARATUS, AND CONTROL METHOD FOR LIGHT SOURCE APPARATUS

(75) Inventors: Junichi Miyamoto, Tokyo (JP); Naoki Masuda, Tokyo (JP); Shuichi Nakanishi, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 287 days.

(21) Appl. No.: 14/359,061

(22) PCT Filed: Sep. 13, 2012

(86) PCT No.: PCT/JP2012/073491
§ 371 (c)(1),
(2), (4) Date: Jun. 2, 2014

(87) PCT Pub. No.: WO2013/077067
PCT Pub. Date: May 30, 2013

(65) Prior Publication Data
US 2014/0313490 A1    Oct. 23, 2014

(30) Foreign Application Priority Data
Nov. 22, 2011    (JP) .................................. 2011-255112

(51) Int. Cl.
*H05B 37/02*    (2006.01)
*H04N 9/31*    (2006.01)
(Continued)

(52) U.S. Cl.
CPC ........... *H05B 37/0227* (2013.01); *G03B 21/16* (2013.01); *G03B 21/206* (2013.01); *G03B 21/2033* (2013.01); *H04N 9/3144* (2013.01); *H04N 9/3194* (2013.01)

(58) Field of Classification Search
CPC .......... H05B 33/0227; H05B 33/0875; G03B 21/2033; G03B 21/026
USPC .................................................. 315/307, 309
See application file for complete search history.

(56) References Cited

U.S. PATENT DOCUMENTS 5,001,656 A * 3/1991 Zimmerman ............ G01K 1/20
374/133
6,239,716 B1 * 5/2001 Pross ........................ G09G 3/14
315/200 A
(Continued)

FOREIGN PATENT DOCUMENTS

JP    61-079285 A    4/1986
JP    61-135171 A    6/1986
(Continued)

OTHER PUBLICATIONS

International Search Report (ISR) (PCT Form PCT/ISA/210), in PCT/JP2012/073491, dated Dec. 18, 2012.

*Primary Examiner* — Don Le
(74) *Attorney, Agent, or Firm* — McGinn IP Law Group, PLLC

(57) ABSTRACT

A light source apparatus according to the present invention includes a circuit board; a light source mounted on the circuit board; a first temperature measurement element that measures an ambient temperature of the circuit board and outputs a first signal that represents the measured result; a second temperature measurement element that measures a temperature of the circuit board and outputs a second signal that represents the measured result; and a light source drive control section that controls driving of the light source. The light source drive control section does not drive the light source if the temperature represented by the second signal is lower than the temperature represented by the first signal.

10 Claims, 3 Drawing Sheets

(51) Int. Cl.
*G03B 21/20* (2006.01)
*G03B 21/16* (2006.01)

(56) References Cited

U.S. PATENT DOCUMENTS

| | | | | |
|---|---|---|---|---|
| 6,713,744 B1 * | 3/2004 | Kubo | ............... | H04N 1/40056 250/205 |
| 2004/0240495 A1 | 12/2004 | Akamatsu | | |
| 2005/0128751 A1 * | 6/2005 | Roberge | ............... | F21K 9/00 362/276 |
| 2006/0193133 A1 * | 8/2006 | Von Der Brelie | . | H05B 33/0821 362/276 |
| 2011/0163691 A1 * | 7/2011 | Dunn | ............... | G09G 3/3426 315/297 |
| 2012/0188287 A1 * | 7/2012 | Wurzel | ............... | G06F 1/203 345/690 |
| 2013/0057995 A1 * | 3/2013 | Feldtkeller | ............... | G01K 7/01 361/87 |
| 2014/0185312 A1 * | 7/2014 | Louderback | ......... | H05K 1/0203 362/553 |
| 2015/0257243 A1 * | 9/2015 | Saffari | ............... | H05B 37/0272 315/113 |

FOREIGN PATENT DOCUMENTS

| | | |
|---|---|---|
| JP | 06-036544 A | 2/1994 |
| JP | 2003-027344 A | 1/2003 |
| JP | 2004-356579 A | 12/2004 |
| JP | 2005-121890 A | 5/2005 |
| JP | 2007-258520 A | 10/2007 |
| JP | 2009-086273 A | 4/2009 |
| JP | 2009-122385 A | 6/2009 |
| JP | 2010-256558 A | 11/2010 |
| JP | 2011-191526 A | 9/2011 |
| WO | WO 2009/008166 A1 | 1/2009 |

* cited by examiner

LIGHT SOURCE APPARATUS, IMAGE DISPLAY APPARATUS, AND CONTROL METHOD FOR LIGHT SOURCE APPARATUS

TECHNICAL FIELD

The present invention relates to light source apparatus; image display apparatus provided with light source apparatus; and control method for light source apparatus.

BACKGROUND ART

Light source apparatuses that have light sources and that output light have been used, for example for image display apparatuses, such as projectors that modulate light based on an image signal and project an image represented by the image signal. In such light source apparatuses, the higher the temperature of the light source, the more likely will the luminous efficiency become lower and/or the light sources will not work. Thus, a variety of cooling techniques using cooling means that cool the light sources such as a fan and a Peltier element have been studied.

Patent Document 1 (JP2005-121890A) discloses a technique that controls driving of cooling means for an image display apparatus having a light source apparatus based on an input image signal. According to the technique disclosed in Patent Document 1, if an image signal that represents a dark image is input to the image display apparatus, the temperature of the light source is kept constant and the current consumption is decreased in such a manner that the output of the light source is decreased, the number of revolutions of the fan is decreased, and the amount of current supplied to the Peltier element is decreased.

Patent Document 2 (WO2009/008166 A1) discloses a technique that provides a temperature sensor in the neighborhood of a light source of a light source apparatus and drives cooling means in such a manner that the temperature of the light source is kept constant based on the temperature measured by the temperature sensor.

RELATED ART DOCUMENT

Patent Document

Patent Document 1: JP2005-121890A
Patent Document 2: WO2009/008166 A1

SUMMARY

Problem to be Solved by the Invention

As described above, in the techniques disclosed in Patent Document 1 and Patent Document 2, the cooling means is driven in such a manner that the temperature of the light source is kept constant. According to the cooling of the light source by the cooling means, and the sudden change of the environment in which the light source apparatus is used, the temperatures of the light source and a circuit board that mount the light source may become lower than the ambient temperature of the circuit board. If the temperatures of the light source and the circuit board become lower than the ambient temperature of the circuit board, dew will condense on the light source and the circuit board. As a result, it is likely that dew will cause terminals of the circuit board to shortcircuit and the light source apparatus will not work.

An object of the present invention is to provide light source apparatus, image display apparatus, and control method for a light source apparatus that can decrease the likelihood that dew that condenses will cause the apparatus not to work.

Means for Solving the Problem

To achieve the above-described object, a light source apparatus according to the present invention includes:
a circuit board;
a light source mounted on the circuit board;
a first temperature measurement element that measures an ambient temperature of the circuit board and outputs a first signal that represents the measured result;
a second temperature measurement element that measures a temperature of the circuit board and outputs a second signal that represents the measured result; and
a light source drive control section that controls driving of the light source,
wherein the light source drive control section does not drive the light source if the temperature represented by the second signal is lower than the temperature represented by the first signal.

To achieve the above-described object, an image display apparatus according to the present invention includes:
the foregoing light source apparatus; and
a projection section that modulates output light of the light source apparatus based on an image signal and projects an image represented by the image signal.

To achieve the above-described object, a control method for a light source apparatus according to the present invention is a control method for a light source apparatus having a light source mounted on a circuit board, including:
measuring an ambient temperature of the circuit board;
measuring a temperature of the circuit board; and
causing the light source not to be driven if the measured temperature of the circuit board is lower than the measured ambient temperature of the circuit board.

According to the present invention, the likelihood that dew that condenses will cause apparatus not to work can be decreased.

EXEMPLARY EMBODIMENT

An exemplary embodiment of the present invention is next described with reference to the accompanying drawings.

Figure 1:
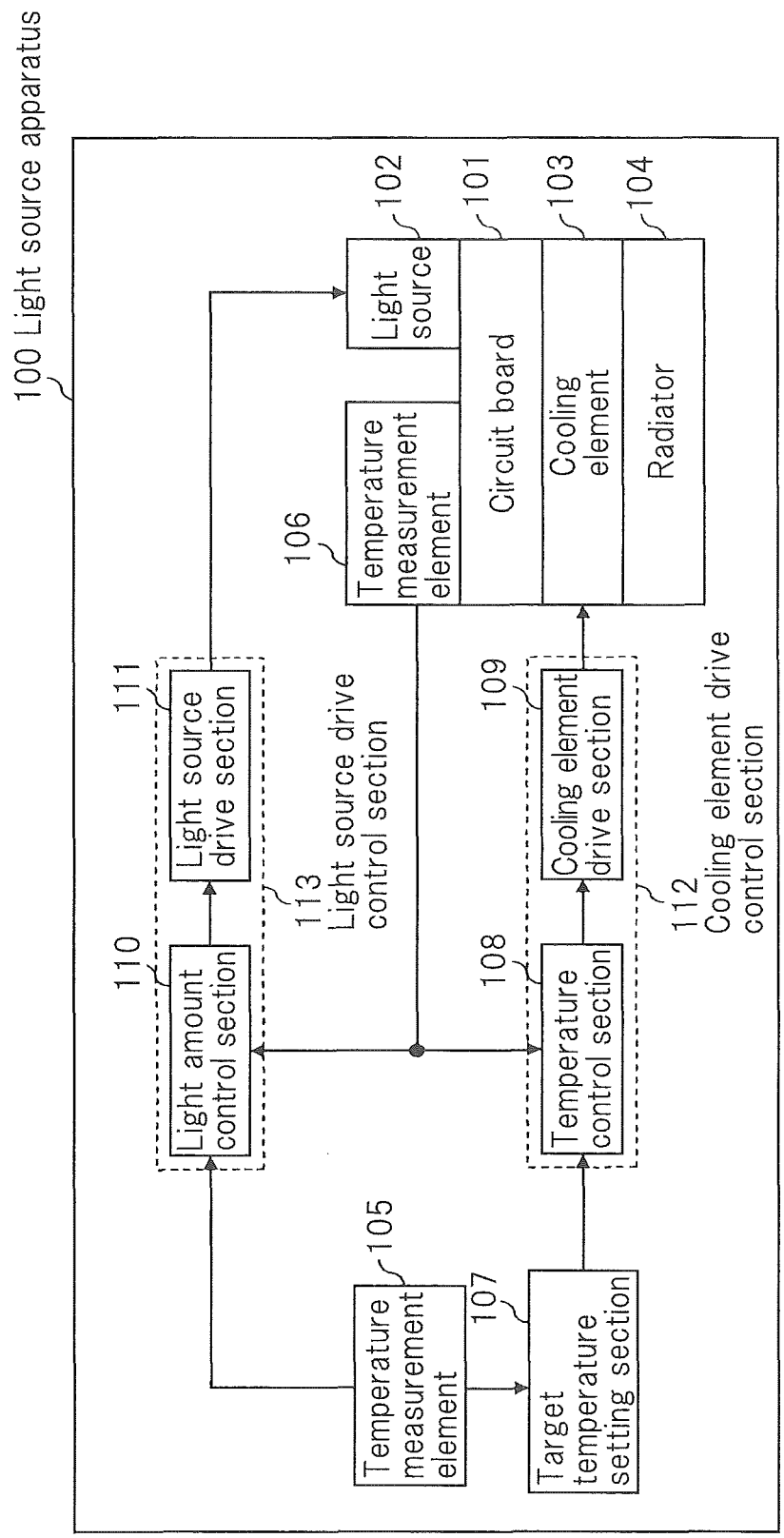
FIG. 1 is a block diagram showing the structure of a light source apparatus according to an embodiment of the present invention.

FIG. 1 is a block diagram showing the structure of light source apparatus 100 according to an embodiment of the present invention. Light source apparatus 100 according to this embodiment is used as a light source apparatus for an image display apparatus such as a projector.

Light source apparatus 100 shown in FIG. 1 has circuit board 101; light source 102; cooling element 103; radiator 104; temperature measurement elements 105 and 106; target temperature setting section 107; temperature control section 108; cooling element drive section 109; light amount control section 110; and light source drive section 111.

Temperature measurement element 105 is an example of a first temperature measurement element, whereas temperature measurement element 106 is an example of a second temperature measurement element.

Light source 102 is for example an LED (Light Emitting Diode) or a semiconductor laser and is mounted on circuit board 101.

Cooling element 103 is physically connected to circuit board 101 and radiator 104. Cooling element 103 absorbs heat from circuit board 101 and thereby cools circuit board 101. Cooling element 103 emits the absorbed heat to radiator 104's side. Cooling element 103 is, for example, a Peltier element that has a cooling surface and a radiating surface, and that absorbs heat through the cooling face and radiates the absorbed heat through the radiating surface by the supply of DC current. If cooling element 103 is a Peltier element, cooling element 103 is located such that the cooling surface faces circuit board 101's side and the radiating surface faces radiator 104's side. Heat conduction material such as heat conduction grease may be interposed between the cooling surface and circuit board 101 and between the radiating surface and radiator 104 so as to improve the adhesion. Moreover, cooling element 103 may be physically connected to circuit board 101 through a member having high heat conduction such as a copper plate.

Radiator 104 radiates heat emitted from cooling element 103.

Temperature measurement element 105 is electrically connected to target temperature setting section 107 and light amount control section 110. Temperature measurement element 105 measures the ambient temperature of circuit board 101 and outputs the measured result to target temperature setting section 107 and light amount control section 110. It is preferred that temperature measurement element 105 be located in the neighborhood of circuit board 101 so as to accurately measure the ambient temperature of circuit board 101. Since the ambient temperature of circuit board 101 is nearly the same as the environmental temperature of the outside of the enclosure of light source apparatus 100, temperature measurement element 105 may be located outside the enclosure of light source apparatus 100. When temperature measurement element 105 is located outside the enclosure of light source apparatus 100, temperature measurement element 105 can easily detect the changes of the ambient temperature of circuit board 101 because the environment in which light source apparatus 100 is used changes. In the following description, the ambient temperature of circuit board 101, which is measured by temperature measurement element 105, is referred to as the ambient temperature.

Temperature measurement element 106 is mounted on circuit board 101 and is electrically connected to temperature control section 108 and light amount control section 110. Temperature measurement element 106 measures the temperature of circuit board 101 and outputs the measured result to temperature control section 108 and light amount control section 110.

Target temperature setting section 107 is electrically connected to temperature control section 108. Target temperature setting section 107 sets a target temperature based on the ambient temperature, which is measured by temperature measurement element 105. The details of the target temperature will be described later.

Temperature control section 108 is electrically connected to cooling element drive section 109. Temperature control section 108 compares the target temperature, which is set by target temperature setting section 107, with the temperature of circuit board 101, which is measured by temperature measurement element 106, and outputs a control signal that controls driving of cooling element 103 based on the compared result to cooling element drive section 109. Specifically, if the temperature of circuit board 101 is higher than the target temperature, temperature control section 108 outputs a control signal that drives cooling element 103 to cooling element drive section 109 so as to cool circuit board 101. In contrast, if the temperature of circuit board 101 is equal to or lower than the target temperature, temperature control section 108 outputs a control signal that does not drive cooling element 103 to cooling element drive section 109.

Cooling element drive section 109 is electrically connected to cooling element 103. Cooling element drive section 109 drives cooling element 103 based on the control signal, which is input from temperature control section 108.

Temperature control section 108 and cooling element drive section 109 make up cooling element drive control section 112 that controls driving of cooling element 103.

Light amount control section 110 is electrically connected to light source drive section 111. Light amount control section 110 compares the ambient temperature, which is measured by temperature measurement element 105, with the temperature of circuit board 101, which is measured by temperature measurement element 106, and outputs a control signal that controls driving of light source 102 based on the compared result to light source drive section 111.

Light source drive section 111 is electrically connected to light source 102. Light source drive section 111 drives light source 102 based on the control signal, which is input from light amount control section 110.

Light amount control section 110 and light source drive section 111 make up light source drive control section 113 that controls driving of light source 102.

Next, the operation of light source apparatus 100 according to this embodiment will be described.

Figure 2:
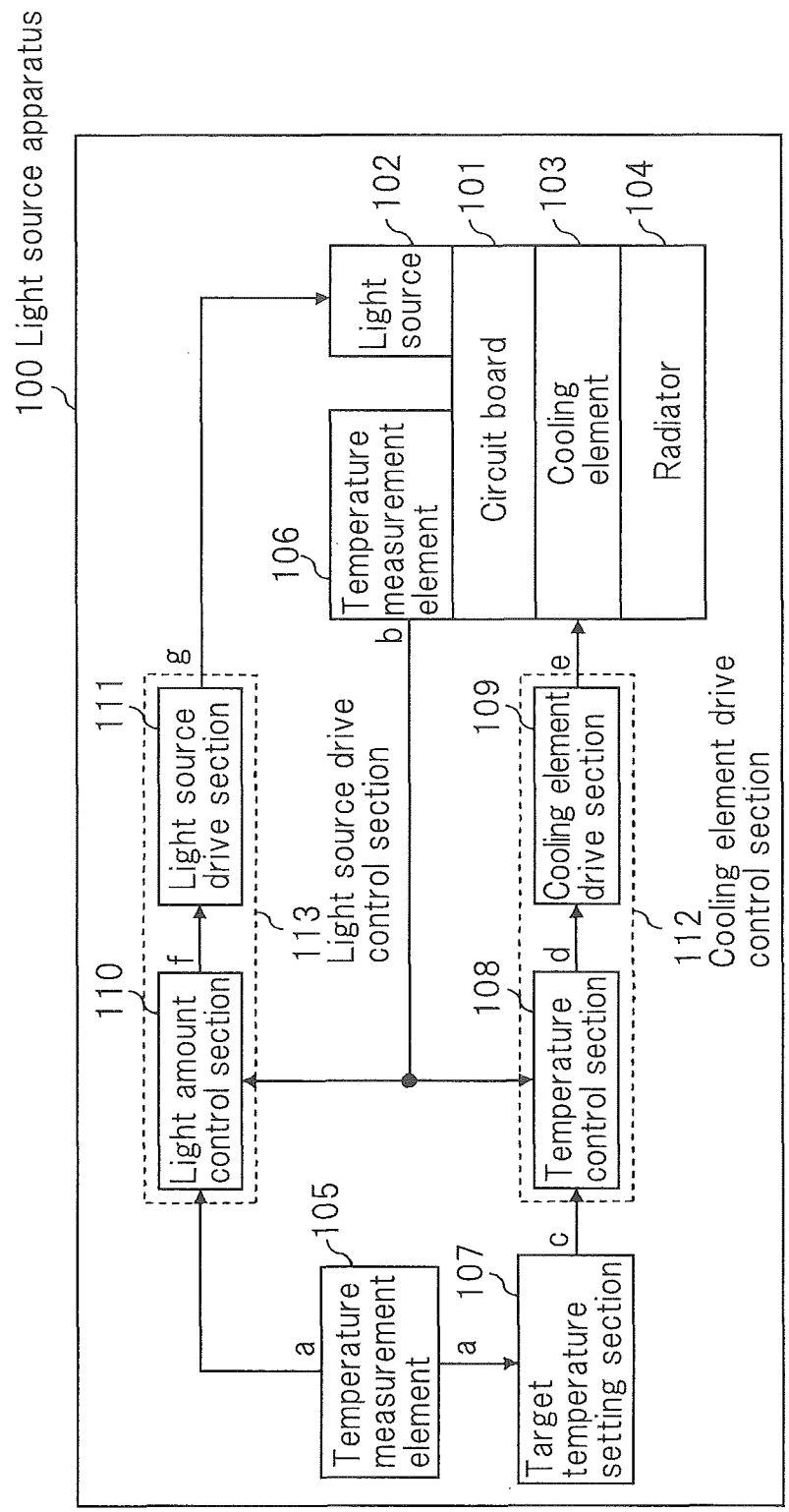
FIG. 2 is a schematic diagram showing the flow of signals in the light source apparatus shown in FIG. 1.

FIG. 2 is a schematic diagram showing the flow of signals in light source apparatus 100 according to this embodiment. In the following description, it is assumed that cooling element 103 is a Peltier element.

Temperature measurement element 105 measures the ambient temperature, for example, periodically and outputs signal a that represents the measured result to target temperature setting section 107 and light amount control section 110. In addition, temperature measurement element 106 measures the temperature of circuit board 101, for example, periodically and outputs signal b that represents the measured result to temperature control section 108 and light amount control section 110.

Target temperature setting section 107 sets a temperature higher than the temperature represented by signal a, which is input from temperature measurement element 105, as a target temperature and outputs signal c that represents the target temperature to temperature control section 108.

Target temperature setting section 107 sets a temperature in which the temperature represented by signal a and a predetermined constant value are added, as the target temperature. A lookup table that correlates ambient temperature and target temperature may be pre-stored in memory (not shown in FIG. 1) or the like. Target temperature setting section 107 may set the target temperature based on the lookup table.

If the lookup table is used, the target temperature can be more freely set than the case where the temperature, in which the ambient temperature and the predetermined constant value are added, is set for the target temperature. For example, if the ambient temperature is in a predetermined range, the target temperature may be a predetermined constant value. For example, the difference between the target temperature and the ambient temperature in the case where the ambient temperature is low may be caused to be larger than that in the case where the ambient temperature is high. As described above, if the temperature of circuit board 101 is equal to or lower than the target temperature, cooling element 103 is not driven. Thus, if the target temperature is set such that the difference between the target temperature and the ambient temperature in the case where the ambient temperature is low is larger than that in the case where the ambient temperature is high, while the ambient temperature is low, driving of cooling element 103 can be reduced and thereby the power consumption can be reduced. In the temperature range of the ambient temperature in which light source apparatus 100 is normally used, for example, 20° C. to 30° C., if the target temperature is set to a constant value, the temperature of circuit board 101 is kept constant in the temperature range. Thus, the temperature of light source 102 is also kept constant and thereby the output fluctuation of temperature measurement element 106 can be reduced.

Temperature control section 108 compares the temperature represented by signal b, which is input from temperature measurement element 106, with the target temperature represented by signal c, which is input from target temperature setting section 107, and outputs control signal d that controls driving of cooling element 103 based on the compared result to cooling element drive section 109. In this embodiment, control signal d is a signal that represents the ratio of the maximum supply current amount that can be supplied to the Peltier element as cooling element 103. In this case, temperature control section 108 outputs control signal d in such a manner that the temperature of circuit board 101 is higher than the target temperature and that the larger the difference from the target temperature, the greater is the increase in the amount of current supplied to cooling element 103. If the temperature of circuit board 101 is equal to or lower than the target temperature, temperature control section 108 outputs control signal d that denotes that the current supplied to the Peltier element is 0%.

Cooling element drive section 109 outputs drive signal e that causes current corresponding to the ratio of the maximum supply current, which is represented by the control signal d, which is input from temperature control section 108, to be supplied, to cooling element 103. If the ratio represented by control signal d is 0%, cooling element drive section 109 does not drive cooling element 103.

Cooling element 103 is driven based on drive signal e, which is input from cooling element drive section 109 so as to cool circuit board 101.

Thus, cooling element drive control section 112, which is composed of temperature control section 108 and cooling element drive section 109, compares the target temperature, which is set to a temperature higher than the ambient temperature, with the temperature of circuit board 101. If the compared result denotes that the temperature of circuit board 101 is higher than the target temperature, cooling element drive control section 112 drives cooling element 103 so as to cool circuit board 101. In contrast, if the temperature of circuit board 101 is equal to or lower than the target temperature, cooling element drive control section 112 does not drive cooling element 103. In this case, as light source 102 emits light, the temperature of circuit board 101 gradually rises up to the target temperature. Thus, in light source apparatus 100 according to this embodiment, since cooling element 103 is driven in such a manner that the temperature of circuit board 101 approaches the target temperature, namely the temperature of circuit board 101 becomes higher than the ambient temperature, there will hardly be any occurrence of dew condensing on circuit board 101, light source 102, and so forth.

When the direction of current supplied to the Peltier element is inverted, the cooling surface and the radiating surface of the Peltier element can be switched. In the techniques disclosed in Patent Document 1 and Patent Document 2, the direction of the current supplied to the Peltier element is inverted from the state in which the light source is being cooled depending on the temperature of the light source such that the cooling surface and the radiating surface are switched to each other. As a result, the light source is heated. However, if the direction of the current supplied to the Peltier element is inverted depending on whenever the light source is cooled or heated, the circuit structure becomes complicated.

By contrast, in this embodiment, cooling element drive control section 112 supplies current to the Peltier element in the direction where circuit board 101 is cooled. Thus, the structure of light source apparatus 100 can be prevented from becoming complicated.

Light amount control section 110 compares the temperature represented by signal a, which is input from temperature measurement element 105, with the temperature represented by signal b, which is input from temperature measurement element 106, and outputs control signal f that controls driving of light source 102 based on the compared result to light source drive section 111. In this embodiment, light amount control section 110 outputs as control signal f a signal that represents the ratio of the maximum output light amount of light source 102. If the temperature of circuit board 101 is lower than the ambient temperature, light amount control section 110 outputs control signal f that denotes that the light amount that is output from light source 102 is 0%.

Light source drive section 111 outputs drive signal g to light source 102. Drive signal g controls driving of light source 102 such that the light amount corresponding to the ratio of the maximum output light amount represented by control signal f, which is input from light amount control section 110, is output from light source 102. Light source drive section 111 adjusts the output light amount emitted from light source 102 based on, for example, the pulse width modulation. Specifically, light source drive section 111 changes the ratio of ON time (light on) and OFF time (light off) of light source 102 in a predetermined time period based on the light amount represented by control signal f so as to adjust the output light amount of light source 102. If the frequency of ON time and OFF time of light source 102 is low, the eye of the user would see that light is flickering. Thus, the frequency is set at around 200 MHz to 500 MHz.

When control signal f that denotes that the output light amount of light source 102 is 0% is input to light source drive section 111, light source drive section turns off light source 102, namely does not drive light source 102.

Thus, if control signal f that denotes that the output light amount of light source 102 is 0% is input to light source drive control section 113, which is composed of light amount control section 110 and light source drive section 111, namely the temperature of circuit board 101 is lower than the ambient temperature, light source drive control section 113 will not drive light source 102.

As described above, since cooling element drive control section 112 controls driving of cooling element 103 such that the temperature of circuit board 101 becomes higher than the ambient temperature, there will hardly be any occurrence of dew condensing on circuit board 101 and so forth. If the environment in which light source apparatus 100 is used suddenly changes and the temperature of circuit board 101 becomes lower than the ambient temperature, even if cooling element drive control section 112 controls driving of cooling element 103, since the temperature of circuit board 101 cannot be sufficiently adjusted, it is likely that dew will condense on circuit board 101 and so forth. Thus, in light source apparatus 100 according to this embodiment, if the temperature of circuit board 101 becomes lower than the ambient temperature, light source apparatus 100 will not drive light source 102. Thus, even if dew condenses, the likelihood that shortcircuiting between terminals will cause light source apparatus 100 not to work can be decreased.

In this embodiment, light source apparatus 100 measures the temperature of circuit board 101, which mounts light source 102, and the ambient temperature. If the temperature of circuit board 101 is lower than the ambient temperature, light source apparatus 100 will not drive light source 102.

If the temperature of circuit board 101 is lower than the ambient temperature, it is likely that dew will condense on circuit board 101. Thus, when light source apparatus 100 is caused not to drive light source 102, the likelihood that dew that condenses will cause the terminals of circuit board 101 to shortcircuit and thereby light source apparatus 100 not to work can be decreased.

As described above, since the target temperature is set at a temperature higher than the ambient temperature, if the ambient temperature is high, the target temperature is also set at a high temperature. When the temperature of circuit board 101 is equal to or lower than the target temperature, circuit board 101 is not cooled. Thus, if the set value for the target temperature is high, it is likely that the temperature of the junction of circuit board 101 and light source 102 (thereinafter this temperature is referred to as the junction temperature of light source 102) will exceed the allowable upper limit value on the specification about the junction temperature of light source 102 and thereby light source 102 will not work.

Thus, in light source apparatus 100 according to this embodiment, the allowable upper limit value of the junction temperature of light source 102 may be pre-stored in memory (not shown in FIG. 1). The junction temperature of light source 102 may be compared with the allowable upper limit value. If the junction temperature of light source 102 is equal to or higher than the allowable upper limit value, the light amount set value for light source 102 may be decreased. In this case, light amount control section 110 calculates the junction temperature of light source 102 based on the temperature of circuit board 101, which is measured by temperature measurement element 106. If the calculated junction temperature is equal to or higher than the allowable upper limit value, light amount control section 110 will decrease the output light amount of light source 102. When the output light amount of light source 102 is decreased, heat generated by light source 102 will be reduced. Thus, even if the ambient temperature is high, the likelihood that the junction temperature of light source 102 will exceed the allowable upper limit value and thereby light source 102 will not work can be decreased. If light source 102 is an LED, the junction temperature of light source 102 can be calculated in such a manner that a value in which the power supplied to light source 102 is multiplied by the thermal resistance coefficient of circuit board 101 is added to the temperature thereof. In this case, the power supplied to light source 102 can be calculated in such a manner that the power supplied to light source 102 when the light amount set value for light source 102 is 100% is multiplied by a value in which the ratio represented by control signal f is divided by 100.

If cooling element 103 does not work, since circuit board 101 is not cooled, the temperature of circuit board 101 will rise. As a result, it is likely that the junction temperature of light source 102 will also rise and exceed the allowable upper limit value. Thus, in light source apparatus 100 according to this embodiment, if the junction temperature of light source 102 has exceeded the allowable upper limit value for a predetermined time period, light amount control section 110 may not be caused to drive light source 102. Thus, even if cooling element 103 does not work, light source 102 can be prevented from not working.

In light source apparatus 100 according to this embodiment, the set value of the target temperature may be changed corresponding to the amount of light output from light source 102. If the output light amount is low, since heat generated by light source 102 is low, the target temperature may be set to a low value as long as the power supplied to cooling element 103 does not increase. As a result, the power consumption of light source apparatus 100 can be reduced.

In light source apparatus 100 according to this embodiment, a light amount detector that detects the output light amount of light source 102 may be located in the neighborhood of light source 102. Light amount control section 110 adjusts the output light amount of light source 102 such that the light amount detected by the light amount detector becomes a preset value. As a result, light amount control section 110 can stabilize the light amount that is output from light source 102.

Figure 3:
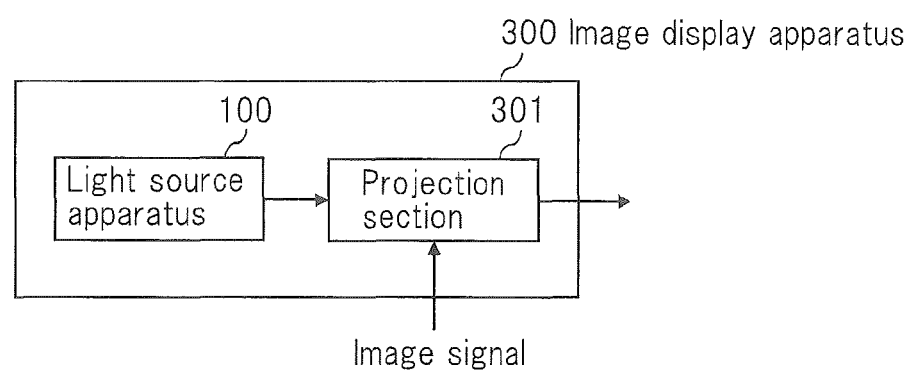
FIG. 3 is a schematic diagram showing the structure of an image display apparatus to which the light source apparatus shown in FIG. 1 is applied.

Light source apparatus 100 according to this embodiment can be applied to an image display apparatus such as a projector. FIG. 3 is a schematic diagram showing the structure of image display apparatus 300 to which optical apparatus 100 according to this embodiment is applied.

Image display apparatus 300 shown in FIG. 3 has light source apparatus 100 as a light source apparatus that has light sources that output color lights of red, green, and blue; and projection section 301 that modulates output light of light source apparatus 100 based on an image signal that is input from the outside. Since the structure and operation of projection section 301 are well known by those in the art and since they are beyond the scope of the present invention, their detailed description will be omitted.

In FIG. 3, for simplicity, image display apparatus 300 has only one light source apparatus 100. However, in reality, image display apparatus 300 has a plurality of light source apparatuses 100 that output different color lights such as those of red, green, and blue. Light source apparatus 100 according to this embodiment may be applied to all of the plurality of light source apparatuses that output lights having difference colors. Alternatively, light source apparatus 100 according to this embodiment may be applied only to a part of the light source apparatuses.

In image display apparatus 300, if the temperature of circuit board 101 of light source apparatus 100 is lower than the ambient temperature, when light source 102 is not driven, a fan (not shown in FIG. 3) with which image display apparatus 300 is provided may be driven. When the fan is driven, since outer air is caused to enter image display apparatus 300, the temperature of circuit board 101 of light source apparatus 100 can become close to the ambient temperature.

The present invention has been described with reference to the embodiments. However, it should be understood by those skilled in the art that the structure and details of the present invention may be changed in various manners without departing from the scope of the present invention.

The present application claims priority based on Japanese Patent Application JP 2011-255112 filed on Nov. 22, 2011, the entire contents of which are incorporated herein by reference in its entirety.

The invention claimed is:

1. A light source apparatus, comprising:
a circuit board;
a light source mounted on said circuit board;
a first temperature measurement element that measures an ambient temperature of said circuit board and outputs a first signal that represents the measured result;
a second temperature measurement element that measures a temperature of said circuit board and outputs a second signal that represents the measured result; and
a light source drive control section that controls driving of said light source,
wherein said light source drive control section does not drive said light source if the temperature represented by said second signal is lower than the temperature represented by said first signal.

2. The light source apparatus according to claim 1, further comprising:
a cooling element that cools said circuit board;
a target temperature setting section that sets a temperature higher than the temperature represented by said first signal as a target temperature; and
a cooling element drive control section that controls driving of said cooling element,
wherein said cooling element drive control section drives said cooling element if the temperature represented by said second signal is higher than the said target temperature, which is set by said target temperature setting section.

3. The light source apparatus according to claim 1,
wherein said light source drive control section calculates the temperature of said light source based on the temperature represented by said second signal and then drives said light source so as to decrease the output light amount if the calculated temperature of the light source is equal to or higher than an allowable upper limit value.

4. The light source apparatus according to claim 3,
wherein said light source drive control section does not drive said light source if the temperature of said light source has been equal to or higher than said allowable upper limit value for a predetermined time period.

5. The light source apparatus according to claim 1,
wherein said first temperature measurement element is located in the neighborhood of said circuit board.

6. The light source apparatus according to claim 1,
wherein said first temperature measurement element is located outside an enclosure of said light source apparatus.

7. An image display apparatus, comprising:
a light source apparatus according to claim 1; and
a projection section that modulates output light of said light source apparatus based on an image signal and projects an image represented by said image signal.

8. A control method for a light source apparatus having a light source mounted on a circuit board, comprising:
measuring an ambient temperature of said circuit board;
measuring a temperature of said circuit board; and
causing said light source not to be driven if said measured temperature of said circuit board is lower than said measured ambient temperature of said circuit board.

9. The control method for the light source apparatus according to claim 8,
wherein said light source apparatus has a cooling element that cools said circuit board;
the control method further comprising:
setting a temperature higher than said measured ambient temperature of said circuit board as a target temperature; and
comparing said target temperature with said measured temperature of said circuit board and causing said cooling element to be driven if said measured temperature of said circuit board is higher than said target temperature.

10. The control method for the light source apparatus according to claim 8 or 9, further comprising:
calculating a temperature of said light source based on said measured temperature of said circuit board and causing said light source to be driven so as to decrease an output light amount if said calculated temperature of said light source is equal to or higher than an allowable upper limit value.

* * * * *